(12) United States Patent
Hwang et al.

(10) Patent No.: US 12,162,353 B2
(45) Date of Patent: Dec. 10, 2024

(54) CONVENIENCE EQUIPMENT PULL-OUT DEVICE FOR A VEHICLE

(71) Applicants: HYUNDAI MOTOR COMPANY, Seoul (KR); KIA CORPORATION, Seoul (KR); EXAOPTONIX Inc., Hwaseong-si (KR); Yong San Co., Ltd., Ulsan (KR)

(72) Inventors: Jin Ho Hwang, Cheonan-si (KR); Min Ho Cho, Suwon-si (KR); Ji Ah Kim, Seoul (KR); Ho Jun Jo, Busan (KR); Eun Sung Kim, Sejong-si (KR); Sang Hoon Lee, Asan-si (KR); Hyung Jin Kim, Seoul (KR)

(73) Assignees: HYUNDAI MOTOR COMPANY, Seoul (KR); KIA CORPORATION, Seoul (KR); EXAOPTONIX Inc., Hwaseong-si (KR); Yong San Co., Ltd., Ulsan (KR)

( * ) Notice: Subject to any disclaimer, the term of this patent is extended or adjusted under 35 U.S.C. 154(b) by 192 days.

(21) Appl. No.: 18/078,569

(22) Filed: Dec. 9, 2022

(65) Prior Publication Data

US 2024/0042852 A1 Feb. 8, 2024

(30) Foreign Application Priority Data

Aug. 4, 2022 (KR) ........................ 10-2022-0097164

(51) Int. Cl.
*B60K 35/00* (2024.01)
*B60J 3/02* (2006.01)
(Continued)

(52) U.S. Cl.
CPC ............. *B60K 35/00* (2013.01); *B60J 3/0243* (2013.01); *B60K 35/22* (2024.01); *B60K 35/60* (2024.01);
(Continued)

(58) Field of Classification Search
CPC .............. B60K 35/00; B60K 2360/771; B60K 2360/777; B60K 35/60; B60K 35/22; B60J 3/0243
See application file for complete search history.

(56) References Cited

U.S. PATENT DOCUMENTS

| 2017/0240027 A1* | 8/2017 | Chen ...................... B60J 3/0234 |
| 2017/0313248 A1* | 11/2017 | Kothari ................. B60K 35/10 |
| 2021/0387512 A1* | 12/2021 | Drake ................... B60J 3/0265 |

FOREIGN PATENT DOCUMENTS

| JP | 2006021729 A | 1/2006 |
| JP | 2006088779 A | 4/2006 |

(Continued)

*Primary Examiner* — Pete T Lee
(74) *Attorney, Agent, or Firm* — Lempia Summerfield Katz LLC

(57) ABSTRACT

Disclosed is a convenience equipment pull-out device for a vehicle. The convenience equipment pull-out device includes: a housing mounted on a headliner of the vehicle, a body which is mounted on the housing and coupled to a movable driving portion and to a plurality of movement guides. In particular, the body slides along the movement guides when the driving portion is driven. The device further includes a pull-out portion rotatably coupled to the body and selectively pulled out towards the interior of the vehicle while a hinge region connected to the body slides along a guide rail member of the housing.

9 Claims, 11 Drawing Sheets

(51) Int. Cl.
*B60K 35/22* (2024.01)
*B60K 35/60* (2024.01)

(52) U.S. Cl.
CPC .. *B60K 2360/771* (2024.01); *B60K 2360/777* (2024.01)

(56) References Cited

FOREIGN PATENT DOCUMENTS

| | | |
|---|---|---|
| JP | 2007245860 A | 9/2007 |
| JP | 2007245964 A | 9/2007 |

* cited by examiner

CONVENIENCE EQUIPMENT PULL-OUT DEVICE FOR A VEHICLE

CROSS-REFERENCE TO RELATED APPLICATION

This application claims, under 35 U.S.C. § 119(a), the benefit of and priority to Korean Patent Application No. 10-2022-0097164, filed on Aug. 4, 2022, the entire contents of which are incorporated herein by reference.

BACKGROUND

(a) Technical Field

The present disclosure relates to a convenience equipment pull-out device for a vehicle. More particularly, it relates to a convenience equipment pull-out device for a vehicle configured to electrically slide at user's request and being selectively pulled out from a roof panel, and providing vehicle information and entertainment image information.

(b) Background Art

Generally, a sun visor is attached in front of a driver's seat or a front passenger's seat to block direct sunlight entering the interior of a vehicle, thereby protecting a driver or a passenger in the passenger seat from sun glare.

Such a sun visor is rotatably mounted via a pivot structure and is rotated towards a windshield glass side and a window glass side to block the light entering the interior of the vehicle.

In other words, the sun visor is a shading plate installed inside a vehicle to avoid direct sunlight. The sun visor is installed in front of a driver's seat or a front passenger's seat to protect a driver from sun glare and secure driver's view when the sun is in front of the vehicle.

Such a sun visor has a limit in a mounting area because the shading plate is accommodated in a roof panel of the vehicle, depending on the size of the shading plate. Thus, the size of the shading plate must be manufactured to correspond to a predetermined mounting area, and consequently, the range in which the shading plate can block sunlight is limited.

In addition, because the angle of the sun visor has to be adjusted manually, it is risky while driving, and as the sun visor is continuously used, the part where the roof panel and the sun visor face is worn out, which causes the hassle of replacing the worn out part.

Meanwhile, recently, there is increased number of people who install a display such as a navigator or a PMP (portable multimedia player) in a vehicle to display travel information such as a map, road condition, or vehicle condition, or to watch TV programs or movies.

In order to mount such a display in a vehicle, a mount for mounting the display on a front window or roof panel of the vehicle must be separately provided. However, such a mount may cause damage to the roof panel in the process of fixing the position thereof, may obscure the driver's view, and may be aesthetically unpleasing.

The above information disclosed in this Background section is provided only to enhance understanding of the background of the present disclosure. Thus, it may contain information that does not form the prior art that is already known to a person of ordinary skill in the art.

SUMMARY OF THE DISCLOSURE

The present disclosure has been made in an effort to solve the above-described problems associated with the prior art.

The present disclosure provides a convenience equipment pull-out device for a vehicle including a display panel configured to output vehicle information, entertainment image information, and the like. The convenience equipment pull-out device allows a sun visor including the display panel to be selectively pulled out from a headliner to thereby provide passengers with additional features such as vehicle information, movies, weather and temperature information while protecting a driver from sun glare, which is a function of a general sun visor.

In one aspect, the present disclosure provides a convenience equipment pull-out device for a vehicle. The device includes: a housing mounted on the headliner of the vehicle; and a body mounted on the housing and coupled to a movable driving portion. In particular, the body is coupled to a plurality of movement guides and can slide along the plurality of movement guides when the driving portion is driven. The device further includes a pull-out portion rotatably coupled to the body and selectively pulled out towards the interior of the vehicle while a pair of hinge regions connected to the body slide along a pair of guide rail members of the housing.

In an embodiment, the pull-out portion may include a sun visor mounted to the headliner of the vehicle.

In another embodiment, the guide rail members may extend in parallel with the movement guides, and may have one end inclined downwards and accommodating therein a locking shaft of a hinge region among the pair of hinge regions.

In still another embodiment, the pair of guide rail members adjust a downward angle of one end of the pull-out portion which has been pulled-out such that a set angle thereof can vary.

In yet another embodiment, the housing may include a pressing member selectively pressing the hinge region and allowing the locking shaft to be brought into close contact with an inner side of the pair of guide rail members.

In still yet another embodiment, the body may include a coupling guide coupled to an outer circumferential surface of the movement guide and also configured to surround the outer circumferential surface of the movement guide and to move along the movement guide when the driving portion is driven.

In a further embodiment, the pull-out portion may include a display panel, and may selectively activate the display panel while electrically sliding to be pulled out towards the interior of the vehicle by a controller.

In another further embodiment, the controller may, when activating the display panel, output different image information depending on a travel mode or a stop mode.

Other aspects and embodiments of the present disclosure are discussed below.

It is to be understood that the term "vehicle" or "vehicular" or other similar terms as used herein are inclusive of motor vehicles in general, such as passenger automobiles including sport utility vehicles (SUV), buses, trucks, various commercial vehicles, watercraft including a variety of boats and ships, aircraft, and the like, and include hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example, a vehicle powered by both gasoline and electricity.

The above and other features of the present disclosure are discussed below.

BRIEF DESCRIPTION OF THE DRAWINGS

The above and other features of the present disclosure are now described in detail with reference to certain exemplary embodiments thereof illustrated in the accompanying drawings which are given hereinbelow by way of illustration only, and thus are not limitative of the present disclosure, and wherein.

Figure 1:
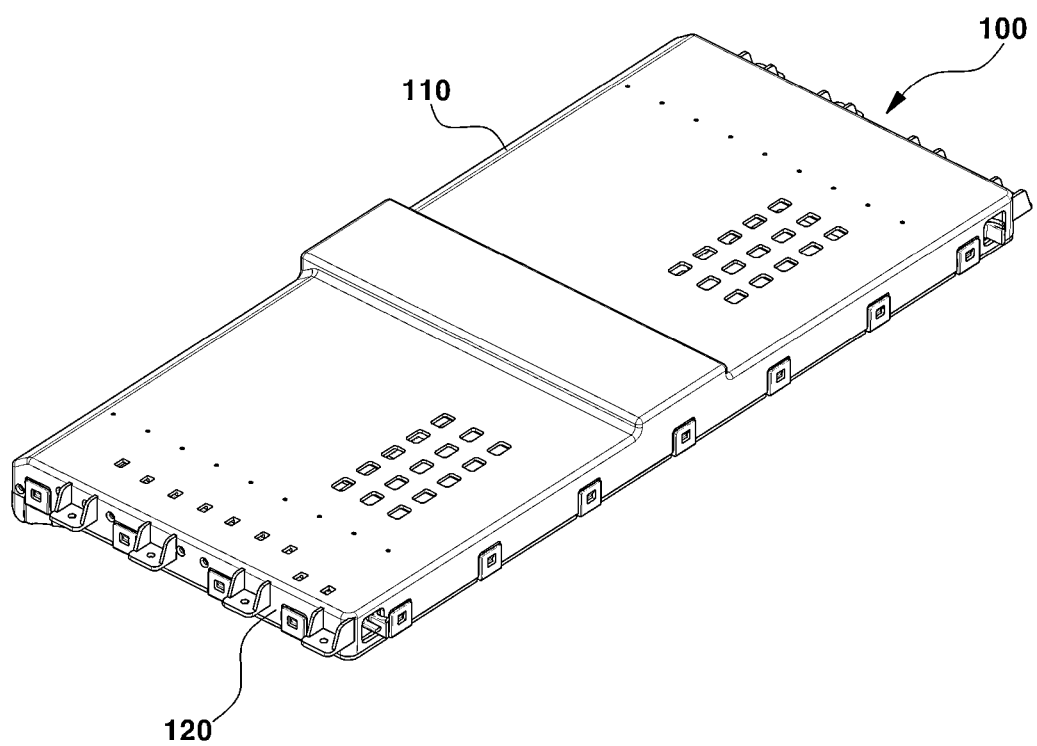
FIG. 1 is a view of a convenience equipment pull-out device for a vehicle according to an embodiment of the present disclosure.

It should be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes, should be determined in part by the particular intended application and usage environment.

In the figures, the reference numbers refer to the same or equivalent parts of the present disclosure throughout the several figures of the drawing.

DETAILED DESCRIPTION

Description is now given in detail according to embodiments disclosed herein, with reference to the accompanying drawings.

Advantages and features of the present disclosure, and a method of achieving the same, should be apparent with reference to the embodiments described below in detail in conjunction with the accompanying drawings.

However, the present disclosure may be embodied in many different forms and should not be construed as being limited to the embodiments set forth herein. Rather, the embodiments are provided so that the present disclosure should be thorough and complete, and fully conveys the scope of the present disclosure to those having ordinary skill in the art. The present disclosure is defined only by the categories of the claims.

In describing the present disclosure, if a detailed explanation of a related known function or construction is considered to unnecessarily divert the gist of the present disclosure, such explanation has been omitted but would be understood by those skilled in the art.

When a component, device, element, or the like of the present disclosure is described as having a purpose or performing an operation, function, or the like, the component, device, or element should be considered herein as being "configured to" meet that purpose or to perform that operation or function.

Figure 2A:
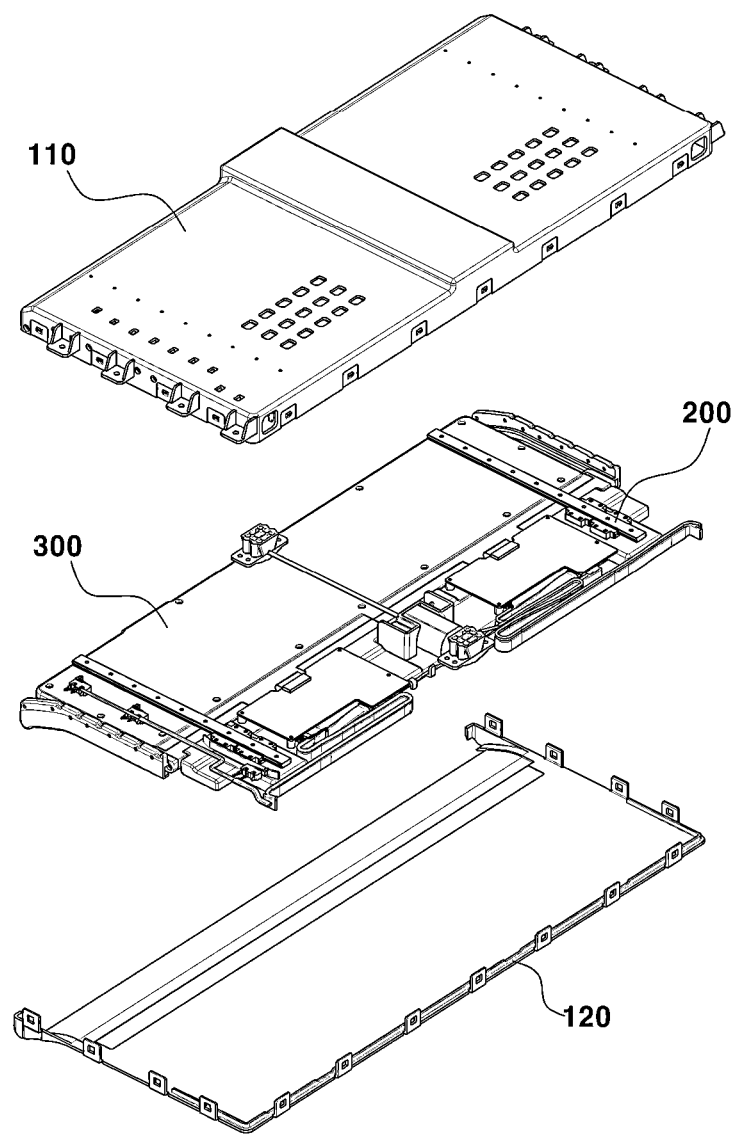
FIG. 2A is an exploded view of a convenience equipment pull-out device for a vehicle according to an embodiment of the present disclosure.
Figure 2B:
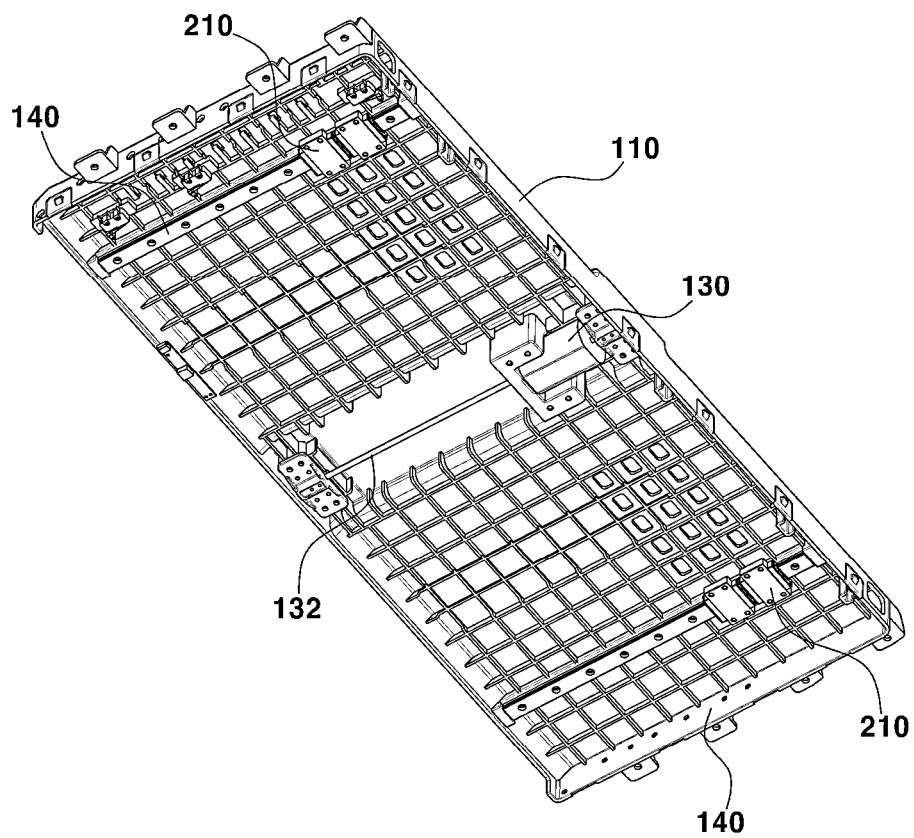
FIG. 2B is a view illustrating an upper housing separated from a convenience equipment pull-out device for a vehicle according to an embodiment of the present disclosure.

FIG. 1 is a view of a convenience equipment pull-out device for a vehicle according to an embodiment of the present disclosure, FIG. 2A is an exploded view of the convenience equipment pull-out device for a vehicle according to an embodiment of the present disclosure, and FIG. 2B is a view illustrating an upper housing separated from the convenience equipment pull-out device for a vehicle according to an embodiment of the present disclosure.

Figure 3:
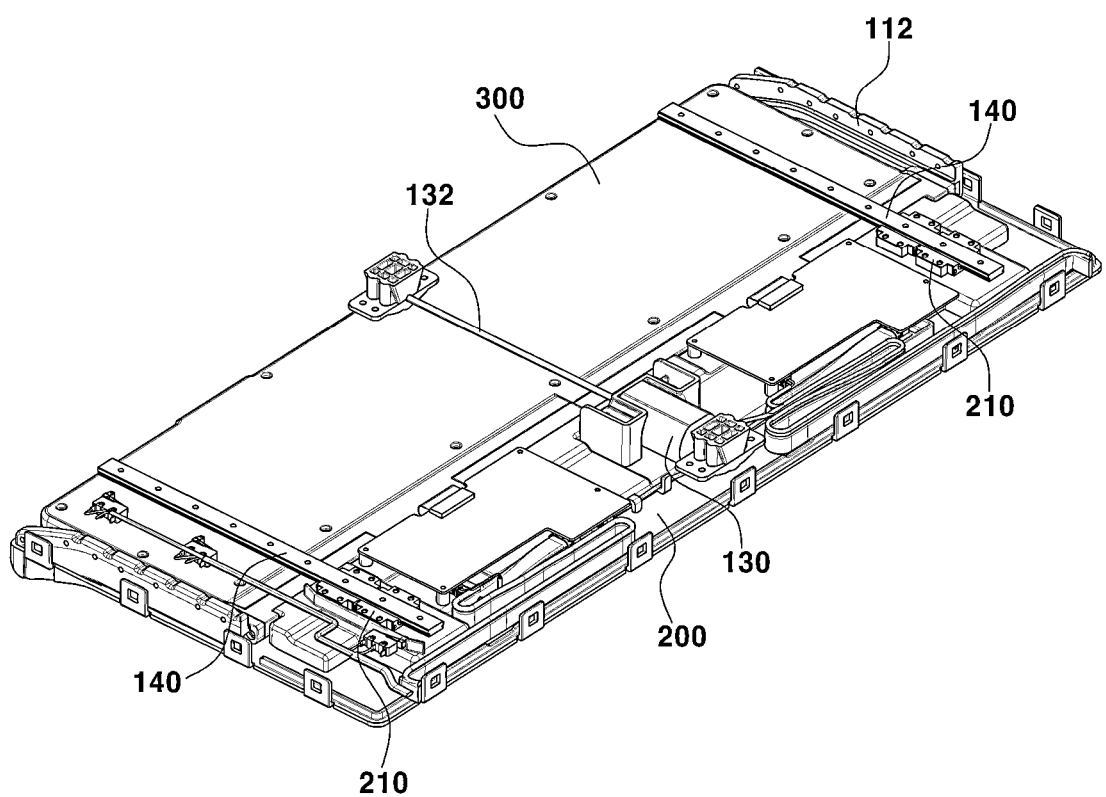
FIG. 3 is a view illustrating the state in which a body and a pull-out portion of a convenience equipment pull-out device for a vehicle are coupled according to an embodiment of the present disclosure.
Figure 4:
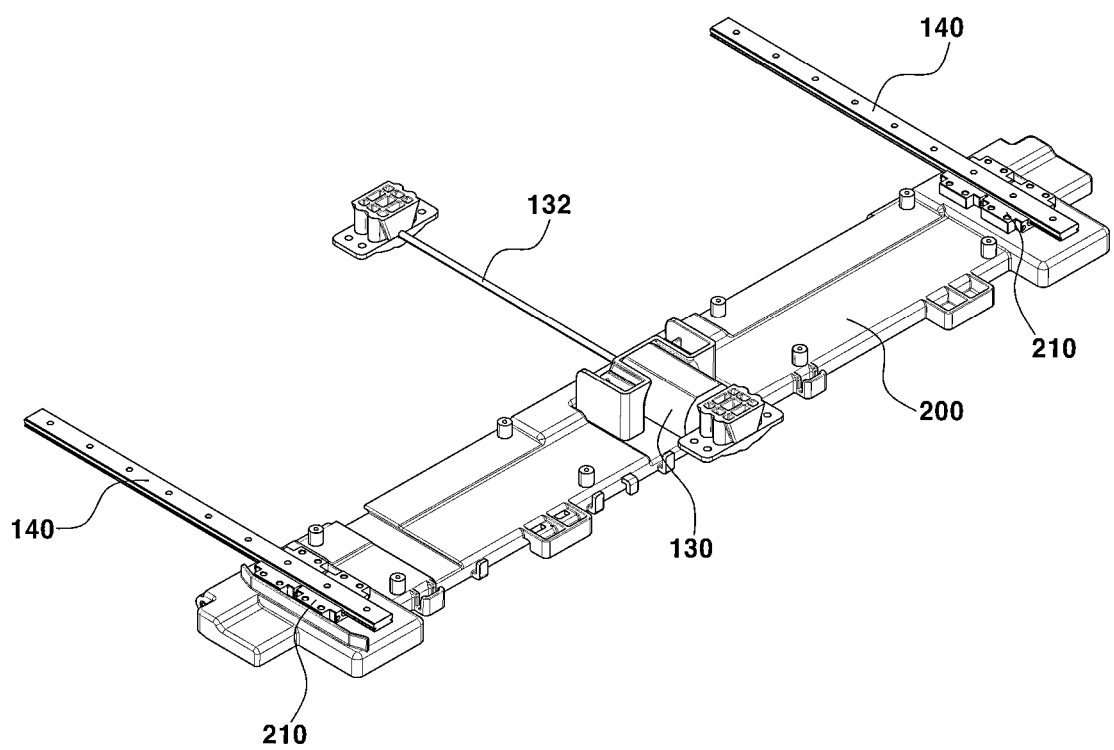
FIG. 4 is a view illustrating a sliding structure of a body of a convenience equipment pull-out device for a vehicle according to an embodiment of the present disclosure.
Figure 5:
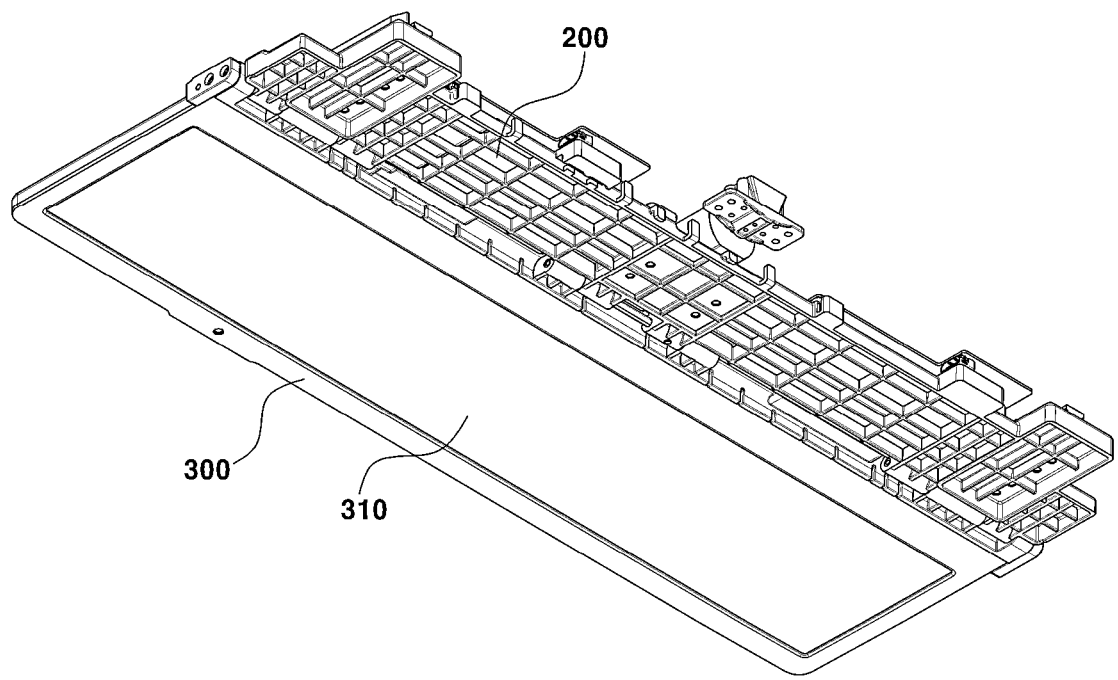
FIG. 5 is a view illustrating a pull-out portion of a convenience equipment pull-out device for a vehicle according to an embodiment of the present disclosure.

FIG. 3 is a view illustrating the state in which a body and a pull-out portion of a convenience equipment pull-out device for a vehicle are coupled according to an embodiment of the present disclosure, FIG. 4 is a view illustrating a sliding structure of the body of the convenience equipment pull-out device for a vehicle according to an embodiment of the present disclosure, and FIG. 5 is a view illustrating the pull-out portion of the convenience equipment pull-out device for a vehicle according to an embodiment of the present disclosure.

Figure 6:
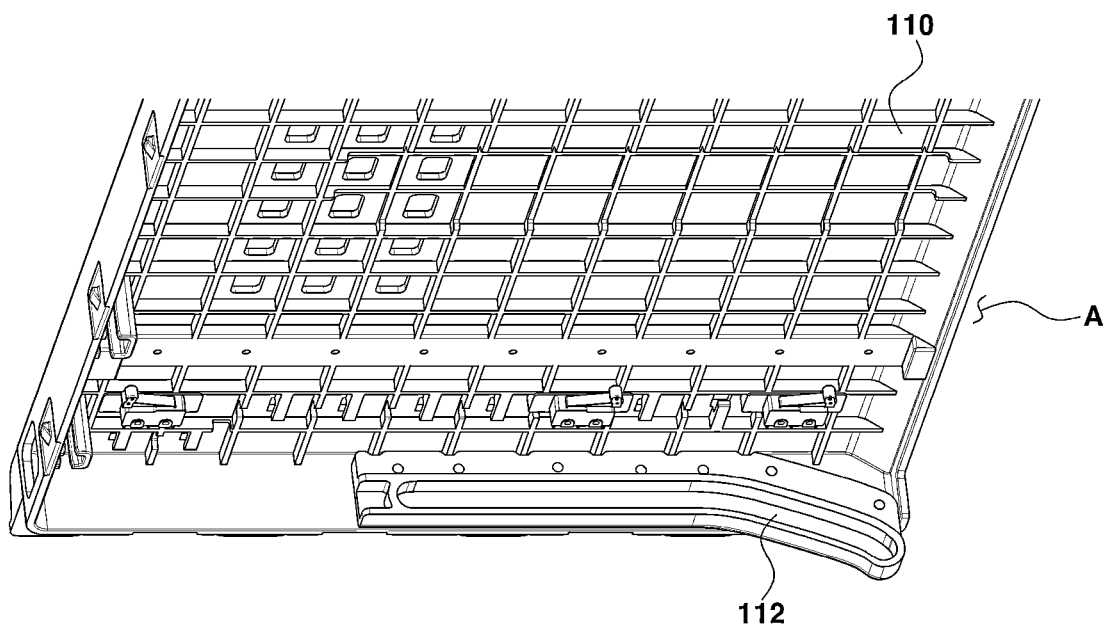
FIG. 6 is a view illustrating a guide rail member of a convenience equipment pull-out device for a vehicle according to an embodiment of the present disclosure.
Figure 7:
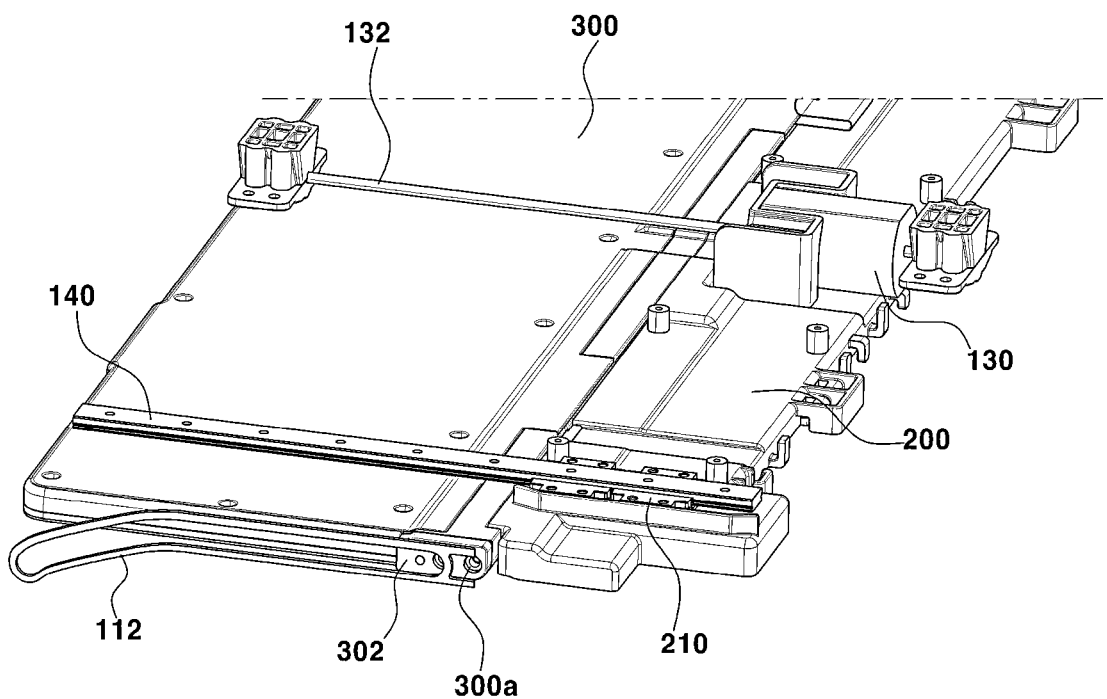
FIGS. 7 to 9 are views illustrating a process of pulling out a pull-out portion of the convenience equipment pull-out device for a vehicle according to an embodiment of the present disclosure.
Figure 8:
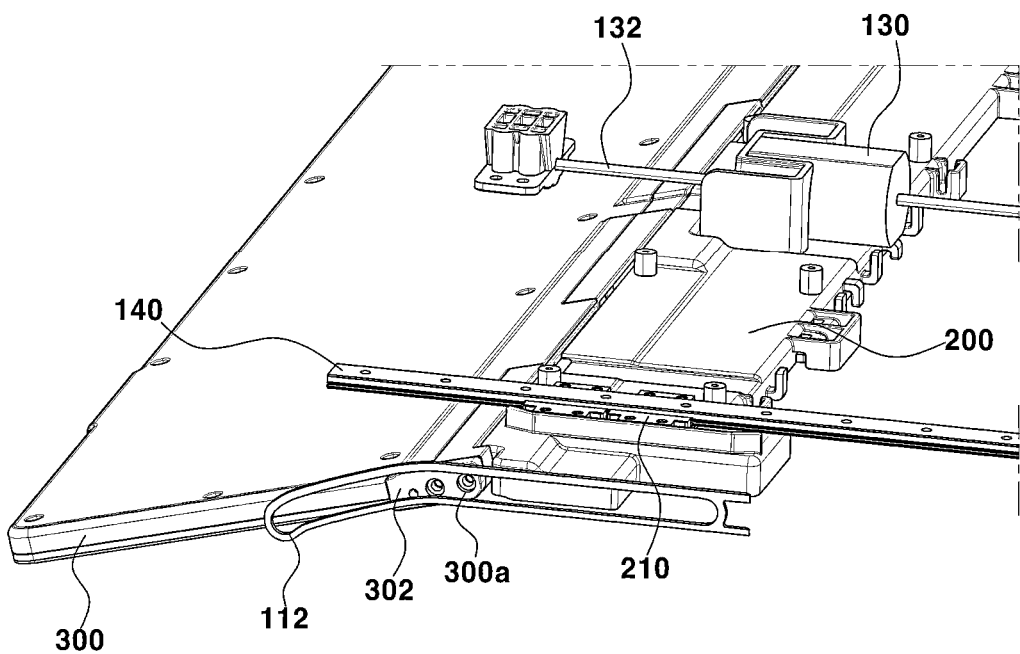
Figure 9:
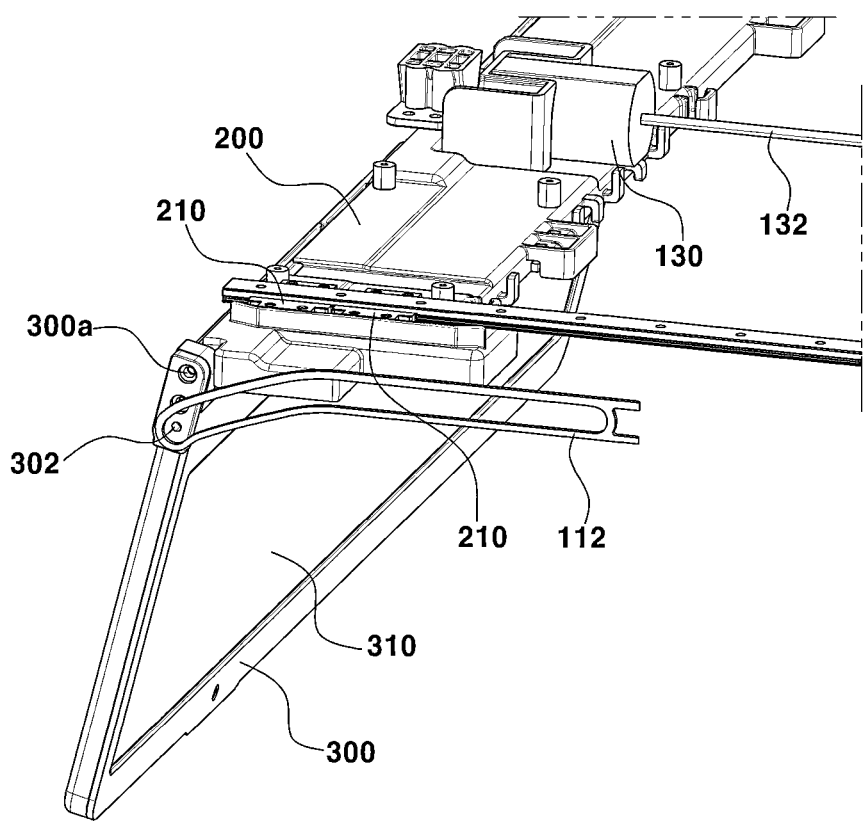
Figure 10:
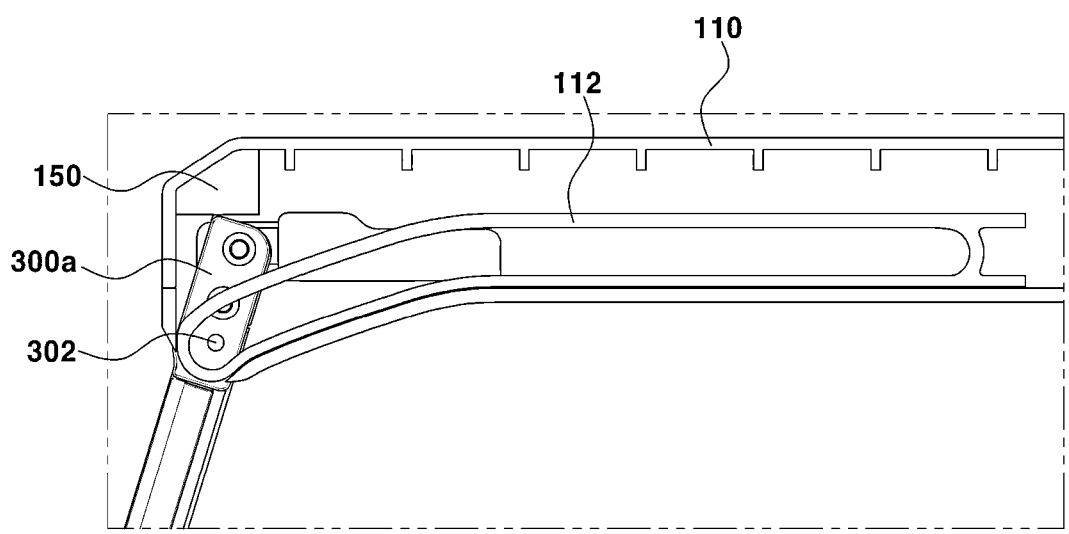
FIG. 10 is a view illustrating a pressing member in a housing of a convenience equipment pull-out device for a vehicle according to an embodiment of the present disclosure.

FIG. 6 is a view illustrating a guide rail member of the convenience equipment pull-out device for a vehicle according to an embodiment of the present disclosure, FIGS. 7 to 9 are views illustrating the process of pulling the pull-out portion of the convenience equipment pull-out device for a vehicle according to an embodiment of the present disclosure, and FIG. 10 is a view illustrating a pressing member in the housing of the convenience equipment pull-out device for a vehicle according to an embodiment of the present disclosure.

As illustrated in FIGS. 1 and 2A, the convenience equipment pull-out device for a vehicle according to this embodiment includes a housing 100, a body 200, and a pull-out portion 300.

The housing 100 is mounted on a headliner of the vehicle and includes an upper housing 110 and a lower housing 120.

The housing 100 may be mounted inside the headliner of the vehicle so as not to be exposed to the outside, and the pull-out portion 300 is drawn out towards the vehicle interior when needed, thereby enhancing aesthetics.

The housing 100 may be mounted on a driver seat side headliner and a passenger seat side headliner. The housing 100 may also be mounted on a headliner at the position corresponding to a second row or third row passenger seat.

As illustrated in FIG. 2B, the upper housing 110 has a central portion provided with a movable driving portion 130 and opposite side portions each provided with a movement guide 140 having a predetermined length and fixed thereto. The body 200 is coupled to the movable driving portion 130 and the movement guides 140, respectively.

The driving portion 130 includes a motor and is coupled to a ball screw 132, thereby enabling the body 200 to slide in the longitudinal direction of the ball screw 132.

In other words, the driving portion 130 is coupled to the body 200 and the ball screw 132 to move forwards or backwards, thereby allowing the body 200 to slide forwards or backwards in the longitudinal direction of the ball screw 132.

In addition, the movement guide 140 is configured to guide the sliding movement of the body 200, and may be implemented as an LM (linear motion) guide.

As a result, as illustrated in FIG. 4, when the driving portion 130 is driven and moved in the longitudinal direction of the ball screw 132, the body 200 coupled to the driving portion 130 slides together therewith and the opposite sides of the body 200 move along the movement guides 140, and thus the movement guides 140 may stably guide the movement of the body 200.

Here, the body 200 may include a plurality of coupling guides 210 respectively coupled to the movement guides 140 while surrounding the same.

The coupling guide 210 is provided in a pair and fixed at opposite sides of the body 200 to support the movement guides 140 without a gap when the body 200 slides while the driving portion 130 is driven in the state in which the coupling guides 212 are rail-coupled to the movement guides 140, thereby allowing the opposite sides of the body 200 to be stably moved along the movement guides 140.

Meanwhile, as illustrated in FIG. 3, the width of the pull-out portion 300 is the same as that of the body 200, and the pull-out portion 300 is rotatably coupled to one surface of the body 200.

The pull-out portion 300 may be implemented in as a sun visor configured to protect a driver from sun glare, but may also be implemented as other convenient equipment selectively pulled out towards the interior of the vehicle.

As a hinge region 300a connected to the body 200 slides along a guide rail member 112 provided at the inner side the upper housing 110. As illustrated in FIG. 6, the pull-out portion 300 is selectively drawn out towards the interior of the vehicle through a front exit A.

In detail, in the state in which the body 200 is located inside the housing 100, the hinge region 300a moves to the end of the guide rail member 112, in other words, the hinge region 300a moves along the guide rail member 112 that is inclined downwards. Thus, the pull-out portion 300 may be drawn out by gradually moving towards the interior of the vehicle.

Here, the guide rail member 112 is disposed in parallel with the movement guide 140 on the inner side of the upper housing 110 and has one end extending to be inclined downwards at a predetermined angle towards the front (see FIG. 6) and receiving a locking shaft 302 of the hinge region 300a therein.

The downwardly inclined angle of the guide rail member 112 may be in range of 60 to 80 degrees so that the pull-out portion 300 can maintain the pulled-out state at a predetermined angle inside the vehicle.

While the pull-out portion 300 is pulled out, the guide rail member 112 may allow the pull-out portion 300 to be mounted on the upper housing 110 in the state in which the inclination angle of the one end inclined downwards is adjusted such that the set angle for pulling out the pull-out portion 300 can be changed.

In other words, generally, the angle of the pull-out portion 300 in the pulled-out state may be set differently depending on the height of the interior of the vehicle and the seat position.

In one embodiment, when the height of the interior of the vehicle is relatively high and the seat position is low, the set angle of the pull-out portion 300 is made to have a gentler angle than the reference, more specifically, the inclination angle at the one end of the guide rail member 112 is set to be 60 degrees or smaller, thereby allowing the passenger to use the pull-out portion 300 more conveniently.

In another embodiment, when the height of the interior of the vehicle is relatively low and the seat position is high, the set angle of the pull-out portion 300 is made to have a sharper angle than the reference, more specifically, the inclination angle at the one end of the guide rail member 112 is set to be 80 degrees or greater, thereby allowing the passenger to use the pull-out portion 300 more conveniently. For these reasons, the angle of the pull-out portion 300 may be set differently depending on the vehicle.

While the vehicle is traveling in the state in which the pull-out portion 300 is pulled out as described above, noise may be generated. For this reason, a pressing member 150 may be provided to prevent such a problem in advance.

The pressing member 150 is configured to selectively press the hinge region 300a as illustrated in FIG. 10. The pressing member 150 allows the locking shaft 302 of the hinge region 300a to be brought into close contact with the inner side of the guide rail member 112 in the state in which the pull-out portion 300 is completely drawn out towards the vehicle interior to prevent the locking shaft 302 from being loose inside the guide rail member 112. Accordingly, it is possible to prevent problems such as noise and vibration that are generated when the locking shaft 302 is loose inside the guide rail member 112 in the state in which the pull-out portion 300 is drawn out while the vehicle is traveling.

The operation of the convenience equipment pull-out device for a vehicle according to this embodiment is described with reference to FIGS. 7 to 9 based on the structure thereof.

First, as illustrated in FIG. 7, before the driving portion 130 is driven, the body 200 and the pull-out portion 300 are disposed inside the housing 100 in the state in which the same are connected to each other by the hinge region 300a. Here, when the driving portion 130 is driven to pull out the pull-out portion 300, the driving portion 130 moves forwards along the ball screw 132, and opposite side portions of the body 200 also move forwards along the movement guides 140 as illustrated in FIG. 8, and eventually, the body 200 and the pull-out portion 300 slide inside the housing 100.

As described above, in the sliding movement of the body 200 and the pull-out portion 300, when the hinge region 300a is positioned at the one end of the guide rail member 112 inclined downwards, the pull-out portion 300 hinged to the body 200 is rotated (see FIG. 8) and is partially exposed to the interior of the vehicle in the rotated state.

In this state, when the body 200 continuously slides by the driving portion 130, the locking shaft 302 is positioned to be locked at the one end of the guide rail member 112. Accordingly, the pull-out portion 300 is completely rotated with respect to the body 200 to be pulled out at a set angle in the interior of the vehicle as illustrated in FIG. 9, thereby performing the function of a sun visor.

As illustrated in FIG. 5, the pull-out portion 300 has a rear surface provided with a display panel 310. The display panel 310 may provide additional functions, such as displaying image information, in addition to the typical function of a sun visor of protecting a driver from sun glare.

In other words, the pull-out portion 300 is electrically slidably moved by the driving portion 130, which is controlled by a controller (not shown), and the pull-out portion 300 is drawn out towards the interior of the vehicle and selectively activates the display panel 310.

In the operation of the display panel 310 activated by the control of the controller (not shown), different image information may be output depending on a travel mode or a stop mode, different image information may be output at the driver's seat side and the passenger seat side in the first row of the vehicle, or different image information may be output at the second row seat or the third row seat.

In the travel mode, the display panel at the first row driver seat may display image information on vehicle information, more specifically, image information on the rear or side of the vehicle, or image information on the second row seat or the third row seat, and image information on temperature, humidity, and precipitation around the vehicle.

In addition, in the stop mode including a parking state, image information photographed through a camera (not shown) provided in the pull-out portion 300, in other words, image information serving as a mirror may be output, and image information such as a movie may also be output to offer entertainment options to a driver, thereby improving the convenience of use.

Such image information may be selectively output through manipulation of the controller (not shown) inside the vehicle. Each of the pull-out portions 300 at the first, second, and third rows may output same image information. Alternatively, different image information may be output depending on the request of a passenger.

As a result, by the control of the controller (not shown) depending on different travel modes or requests of passengers, the pull-out portion 300 may output different desired image information through the display panel 310, and thus, in situations such as camping or traveling, the pull-out portion 300 provides appropriate convenience, thereby enhancing the commercial properties of the sun visor device.

As is apparent from the above description, the present disclosure provides the following effects.

The present disclosure provides a display panel configured to output vehicle information, entertainment image information, and the like, and allows a sun visor including the display panel to be selectively pulled out from a headliner to thereby provide passengers with additional features such as vehicle information, movies, weather and temperature information while protecting a driver from sun glare, which is a function of a general sun visor.

According to the present disclosure, the sun visor slides in a straight direction inside the housing, provided in the headliner, and rotates along with the sliding movement to be drawn out towards the interior of the vehicle, thereby providing an aesthetically pleasing appearance. In addition, because the sun visor may be stored inside the headliner without being exposed to the outside when not in use, the degree of freedom with respect to the size and shape of the sun visor may be increased.

In the above, embodiments of the present disclosure have been described with reference to the accompanying drawings. However, those having ordinary skill in the art to which the present disclosure pertains should understand that various modifications may be made therefrom, and that all or part of the above-described embodiment(s) may be selectively combined. Therefore, the true technical protection scope of the present disclosure should be determined by the technical ideas of the appended claims.

What is claimed is:

1. A convenience equipment pull-out device for a vehicle, the device comprising:
   a housing mounted on a headliner of the vehicle;
   a body mounted on the housing and coupled to a movable driving portion, wherein the body is coupled to a plurality of movement guides and configured to slide along the plurality of movement guides when the driving portion is driven; and
   a pull-out portion rotatably coupled to the body and configured to be selectively pulled out towards an interior of the vehicle while a pair of hinge regions connected to the body slide along a pair of guide rail members of the housing.

2. The convenience equipment pull-out device of claim 1, wherein the pull-out portion comprises a sun visor mounted to the headliner of the vehicle.

3. The convenience equipment pull-out device of claim 1, wherein the pair of guide rail members extend in parallel with the plurality of movement guides.

4. The convenience equipment pull-out device of claim 3, wherein the pair of guide rail members include a one end inclined downwards and configured to accommodate therein a locking shaft of a hinge region among the pair of hinge regions.

5. The convenience equipment pull-out device of claim 3, the pair of guide rail members are configured to adjust a downward angle of one end of the pull-out portion which has been pulled-out such that a set angle thereof varies.

6. The convenience equipment pull-out device of claim 4, wherein the housing comprises a pressing member configured to selectively press a hinge region among the pair of hinge regions and configured to allow the locking shaft to be brought into close contact with an inner side of the pair of guide rail members.

7. The convenience equipment pull-out device of claim 1, wherein the body comprises a coupling guide coupled to an outer circumferential surface of a movement guide of the plurality of movement guides and configured to surround the outer circumferential surface of the movement guide and to move along the movement guide when the driving portion is driven.

8. The convenience equipment pull-out device of claim 1, wherein the pull-out portion comprises a display panel, and the pull-out portion is configured to selectively activate the display panel while electrically sliding to be pulled out towards the interior of the vehicle by a controller.

9. The convenience equipment pull-out device of claim 8, wherein when activating the display panel, the controller is configured to output different image information based on a travel mode or a stop mode.

* * * * *